US009080867B2

(12) United States Patent
Lippuner et al.

(10) Patent No.: US 9,080,867 B2
(45) Date of Patent: Jul. 14, 2015

(54) MEASURING METHOD FOR AN ARTICULATED-ARM COORDINATE MEASURING MACHINE

(75) Inventors: Heinz Lippuner, Rebstein (CH); Knut Siercks, Moerschwil (CH)

(73) Assignee: LEICA GEOSYSTEMS AG, Heerbrugg (CH)

(*) Notice: Subject to any disclaimer, the term of this patent is extended or adjusted under 35 U.S.C. 154(b) by 1300 days.

(21) Appl. No.: 12/937,423

(22) PCT Filed: Apr. 17, 2009

(86) PCT No.: PCT/EP2009/054607
§ 371 (c)(1),
(2), (4) Date: Oct. 12, 2010

(87) PCT Pub. No.: WO2009/130169
PCT Pub. Date: Oct. 29, 2009

(65) Prior Publication Data
US 2011/0046917 A1    Feb. 24, 2011

(30) Foreign Application Priority Data
Apr. 22, 2008 (EP) ..................................... 08103652

(51) Int. Cl.
*B25J 9/06* (2006.01)
*G01B 5/004* (2006.01)
*G06F 17/18* (2006.01)
*G01B 21/04* (2006.01)
*G01B 5/008* (2006.01)
*B25J 9/16* (2006.01)
*B25J 13/02* (2006.01)

(52) U.S. Cl.
CPC .............. *G01B 21/045* (2013.01); *G01B 5/004* (2013.01); *G01B 5/008* (2013.01); *G01B 21/04* (2013.01); *B25J 9/06* (2013.01); *B25J 9/1612* (2013.01); *B25J 13/02* (2013.01)

(58) Field of Classification Search
CPC ...... G01B 21/045; G01B 21/04; G01B 5/004; G01B 5/008; B25J 9/1612; B25J 9/06; B25J 13/02
See application file for complete search history.

(56) References Cited

U.S. PATENT DOCUMENTS 4,561,776 A * 12/1985 Pryor .............................. 356/72
5,388,342 A   2/1995 Garau et al.
(Continued)

FOREIGN PATENT DOCUMENTS

| DE | 4325337 A1 | 2/1994 | |
|---|---|---|---|
| DE | 4325347 A1 | 2/1994 | |
| EP | 0318557 * | 4/1992 | ............. G01B 21/04 |

(Continued)

*Primary Examiner* — Janet Suglo
*Assistant Examiner* — L. Anderson
(74) *Attorney, Agent, or Firm* — Maschoff Brennan (57) ABSTRACT

A measuring method for determining a measurement position of a probe element 6 can include using a coordinate measuring machine 1 having a base and members that can be moved relative to the base and relative to each other, wherein one of the members, as the probe member TG, comprises a probe element 6, so that the probe element 6 can move freely within a prescribed volume of space, wherein the measurement position is captured by the probe element 6, a measurement variable set is taken by measuring measurement variables linked to a measurement position of the members, wherein the measurement position is determined by a relative location of the members to each other and of at least one of the members to the base, and the measurement position is determined relative to the base.

29 Claims, 6 Drawing Sheets (56) References Cited

U.S. PATENT DOCUMENTS 5,402,582 A * 4/1995 Raab .............................. 33/503
6,820,025 B2 * 11/2004 Bachmann et al. ............. 702/94

FOREIGN PATENT DOCUMENTS

| EP | 2 075 096 A1 | 7/2009 |
| WO | 98/08050 | 2/1998 |

* cited by examiner

MEASURING METHOD FOR AN ARTICULATED-ARM COORDINATE MEASURING MACHINE

The invention relates to a measuring method for a coordinate measuring machine, and to such a coordinate measuring machine, as well as to a computer program product.

BACKGROUND

The need exists in many fields of application to measure measuring points of a surface of objects, and thus the objects themselves, with high accuracy. This is true, in particular, of the manufacturing industry, for which the measurement and inspection of surfaces of workpieces is of great importance.

There exists for these applications a range of measuring instruments that are designed for special tasks and are mostly denoted as coordinate measuring instruments or machines. These measuring instruments measure the surface for the establishment of a mechanical contact with the measuring point to be measured. Examples of this are portal measuring machines such as are described in DE 43 25 337 or DE 43 25 347, for example. Another system is based on the use of an articulated arm whose stylus arranged at the end of the multipartite arm can be brought into contact with the measuring point of a surface. Generic 3D coordinate measuring articulated arms are described in U.S. Pat. No. 5,402,582 or DE 1 474 650, for example. Comparable systems, also termed "Articulated Arm" or "Portable CMM" are, for example, piloted by "Romer" as "Sigma", "Flex" or "Omega", and by "CimCore" as "Infinite" or "Stinger".

3D coordinate measuring articulated arms have a base, which is known in a reference coordinate system and fixedly positioned as one end of the articulated arm, and an opposite, movable measuring end on which the stylus is arranged. A tactile probe that consists, for example of a ruby ball that is mounted on a measuring rod can be used as standard stylus. Also alternatively known as probe elements are optical sensors that can be designed, for example, as a point gage or as a scanner, that is to say as scanning an object surface continuously and, for example, in a linewise fashion. Particularly, triangulation sensors can be used as such optical sensors. Furthermore, for example European patent application No. 07124101.2 describes the use of a camera as probe element that is designed to record or acquire a measurement object surface and is mounted on the movable end of an articulated arm. The position and alignment of the camera in space can be determined with high precision with the aid of the articulated-arm coordinate measuring machine.

A plurality of members or arm sections that can be pivoted and/or rotated relative to one another and are connected displaceably in relation to one another, if appropriate, are arranged between the two ends of the articulated arm such that the measuring end with the stylus, which is denoted as the probe member, can move freely within a portion of space. To this end, the members of the arm are interconnected by means of rotary, spherical and/or swivel joints as well as, if appropriate, by means of suspensions that enable a linear displacement. Furthermore, the articulations and/or suspensions are assigned position measuring devices such that it is possible in each case to measure a position of the members relative to one another, that is to say a relative position can be measured in each case between the members. For example, use may be made to this end of optoelectronic goniometers and optoelectronic length gages—as well as, particularly, optoelectronic position transducers that are designed to determine a relative position of members connected by means of a spherical joint.

The position of the stylus—and thus the position of the measuring point with which the stylus makes contact—relative to the base can be determined and specified in the reference coordinate system given the knowledge of an instantaneous measurement setting of the members, that is to say the respective positions of the members relative to one another, as well as of one of the members relative to the base. The determination of the position is generally performed by an evaluation unit that acquires the measured variables measured by the respective position measuring devices and derives the measuring point position therefrom. For example, computers or arithmetic logic units programmed particularly for this application can be used for this purpose.

In the case of such coordinate measuring machines, in particular in the case of articulated arm systems, it is usual to determine measuring points by using the individual measurement method, a measurement of the instantaneous member position being performed from each measuring point with which contact is made.

Although the use of high precision optoelectronic position measuring devices suffices to achieve high accuracies in the determination of the coordinates of a measuring point, many fields of application require a yet higher accuracy and, in particular, higher reliability for the determination of position.

For example, the friction in the articulations can lead to sagging of the connecting elements, and thus to a measuring error. Furthermore, friction in the bearings of the articulations can also result in occurrence of the so called slip-stick effect, as a result of which measuring errors can also occur. The term slip-stick effect in this case denotes the sliding back of solid bodies moving against one another, a sequence of movements comprising sticking, bracing, separation and sliding away being executed in each case.

Publication text WO 98/08050 discloses an articulated-arm coordinate measuring machine that has shock detectors and/or temperature sensors for the minimization or compensation of measuring errors.

A further known method for increasing the accuracy and the reliability of point measurements by coordinate measuring machines provides for the point that is to be measured not only to experience contact once, but for a second and, if appropriate, third control measurement to be carried out by removing and reapplying the stylus to the measuring point, that is to say by a new, decoupled measurement operation for the same measuring point. This method permits the detection of gross measuring errors of a point measurement, for example by a comparison of measuring point positions determined for one and the same measuring point—with the aid of measurement operations carried out separately. However, the comparatively large outlay of carrying out a control measurement proves to be disadvantageous in this case. There is likewise the risk that the stylus does not bear against exactly the same measuring point during a control measurement, and thus that an originally accurate, first measurement is corrupted as a result of the control measurement and leads to an inaccurate determination of position.

It emerges, furthermore, that—by contrast with the carrying out of only a single measurement—the accuracy with which the position of a measuring point is determined can be improved not at all or only to a certain extent, by carrying out one or two control measurements.

SUMMARY

One object of the invention is therefore to provide an improved measuring method for determination of the position of a measuring point with the aid of a coordinate measuring machine, in particular with regard to the accuracy and reliability that can be attained in this case. In particular, the aim is for the measuring method additionally to be capable of simple execution.

A further object of the invention is the provision of an improved coordinate measuring machine. In particular, the aim is for the coordinate measuring machine to enable the determination of the position of a measuring point to be more accurate and reliable and at the same time capable of simple execution in conjunction with a low outlay on hardware modification. Particularly, the aim is to improve the ratio of total accuracy for the determination of the position to the respective achievable accuracies of the individual position measuring devices of the coordinate measuring machine.

These objects are achieved by implementing the characterizing features of the independent claims. Features that develop the invention in an alternative or advantageous way are to be gathered from the dependent patent claims.

The inventive measuring method for determining the position of a measuring point with the aid of a coordinate measuring machine rids itself of the condition, necessary with reference to the method of the prior art, that exactly one measurement of the current position of the members of the coordinate measuring machine is performed for a measurement operation. By contrast, in accordance with the invention a plurality and, in particular, a multiplicity of measurements are recorded in order to determine the position of a measuring point. By means of statistical evaluation methods, the targeted position of the measuring point can be determined with significantly improved accuracy and reliability from the plurality of measurements, there being, in particular, a number of at least approximately 10, particularly at least approximately 100 or at least approximately 1000, measurements in different measurement settings of the members.

For this purpose, the probe element of the coordinate machine is brought into a measuring position, for example into contact with the point to be measured on an object surface. In this measuring position, the probe element—or, in particular, the probe member having the probe element—is fixed such that the measuring position is maintained for a certain period. In this spatially fixed state of the probe element or of the probe member, a plurality of different measurement settings of the members are generated in accordance with the invention. Here, a different measurement setting is understood to be a relative position of at least two of the members that has been changed in space—that is to say relative to a fixed base, positioned in a known fashion in a reference coordinate system, of the coordinate measuring machine.

The different measurement settings are acquired in this case with the aid of position measuring devices that respectively measure the positions of the members relative to one another. This is performed by respectively recording at least one set of measured variables for a measurement setting such that a plurality of sets of measured variables are stored. A set of measured variables respectively consists in this case of variables, measured for a measurement setting, that are determined by the position measuring devices. For example, pivot angles or angles of rotation as well as, if appropriate, lengths between the members are measured in a known fashion as measured variables by goniometers or length gages as position measuring devices.

A correspondingly large number of sets of measured variables can be recorded for the purpose of determining the position of the sole measuring point by means of the inventive generation of, in particular, a large number of different settings of the members relative to one another, the probe element being fixed in the measuring position. All the sets of measured variables in this case describe the same position. Ideally, —purely theoretically—the exact same position should thus always be derived in a separate evaluation of each individual set of measured variables, the sets of measured variables describing, as it were, merely respectively different paths from the base to a measuring point. The measurements acquired for different relative positions of the members respectively deviate slightly from one another, inter alia, because of the measurement inaccuracies, which are, however, present in practice, of the individual position measuring devices, as well as of the measuring errors described at the beginning and caused by friction in the bearings of the articulations—for example, owing to the slip-stick effect. Since, given a multiplicity of measurements, the slight measuring errors now respectively balance one another out in the ideal case—viewed statistically—according to the invention the position can be calculated with a substantially increased accuracy by contrast with a single measurement. To this end, the acquired sets of measured variables are preferably evaluated statistically in compensation calculation, and the targeted position of the measuring point is derived therefrom.

In order to generate the different measurement settings, it is possible in this case to perform a changing of the positions of the members that is repeated or performed continuously over a certain period, it being possible to execute for this purpose any desired type of deflection at least on one of the members from its current spatial position.

For example, it is possible for this purpose to exert a force on one of the members such that the relative position of the members to one another is varied. A single, by way of example, linear or circular movement of the member, or else a repeated, jolting or jittering movement of the member, suffices for this purpose in a simple case. The movement of the member in space can here be executed in the micrometer or millimeter range, but also in the range of a number of centimeters or decimeters. A plurality of members are moved simultaneously one against another by putting one of the members in the spatially fixed state of the stylus. Purely by way of example, a number of several 10 or 100 sets of measured variables can already be recorded for a determination of position in the event of a continuous movement of one of the members over a period of, for example, a few tenths of a second or a few seconds and given an acquisition rate of measurement settings of, for example, 100 Hz. However, it is to be borne in mind in this case that the measured variables of the individual position measuring devices are respectively acquired simultaneously—or at least approximately simultaneously—for current measurement settings that are the same in each case. The movement of one or more of the members can in this case be performed manually by a user, but also by machine, for example by means of an electric drive unit or vibration generator unit acting on one or more of the members. In special cases of application, a tremor of the user's hand while holding one of the members—for example, including the probe member when contact is being made with the measuring point—can also suffice to generate the different measurement settings.

Purely theoretically, as advantageous in this case for the purpose of compensating the measuring errors caused by the slip-stick effect and by sagging of the connecting elements it proves useful to execute a large number of movement reversals when generating the different measurement settings, in particular so that the forces exerted to move the arm members act in the mechanical structure in all spatial directions in a fashion distributed as equally as possible statistically. Thus, such a mechanical movement of the members permits a relatively good averaging of the errors caused by friction and sagging.

In summary, according to the invention it is now possible to record a multiplicity of measurements for the determination of a single measuring position in conjunction with a low outlay for the measurement operation. Consequently, the measuring position can be determined in a fashion substantially more reliable and exact. There is no need in this case to remove the probe element from the measuring position and return it again thereto, and in any case such action would not permit the inventive acquisition of the multiplicity of measurements, owing to the expenditure of time required therefor.

All known statistical methods can be used for the statistical evaluation of the sets of measured variables such as for example, an optimizing statistical estimation method, in particular a compensation calculation using the method of least squares. It is likewise possible, in addition, to employ a statistical modeling for the purpose of computational compensation of known systematic errors.

As regards equipment, the inventive coordinate measuring machine has a base and a plurality of members that can be moved relative to the base and relative to one another for the purpose of determining the position of a measuring point, one of the members having a probe element as probe member. Here, the probe element can be moved freely within a prescribed space volume, and be brought into a desired measuring position. The probe element is designed in this case, in particular, to make contact at a measuring point by touching it, said probe element assuming the measuring position—or, expressed otherwise, a probe position—in the state contacting the measuring point. Furthermore, a plurality of position measuring devices are present for the measurement of measured variables that depend on a measurement setting of the members relative to one another. A current measurement position is given in this case by a current position of the members relative to one another, as well as at least one of the members relative to the base.

The determination of the measuring position is performed by an evaluation unit that is designed according to the invention for acquiring a plurality of sets of measured variables for different measurement settings in a single, fixed measuring position, and for deriving this position with the aid of a statistical evaluation of the recorded sets of measured values.

In particular, the evaluation unit is thus designed for carrying out the steps of:
  repeated acquisition of a set of measured variables for the different measurement settings in each case, and
  determination of the measuring position with the aid of a statistical evaluation of recorded sets of measured variables
in the course of the inventive measuring method.

In a particular embodiment, the coordinate measuring machine has a dynamization component for the active generation of the plurality of different measurement settings. In particular, the dynamization component can be used to exert a, in particular, varying force acting on at least one of the members. For example, the dynamization component can be arranged on one or more of the members and be designed as an electrically operated drive unit, in particular as an electric vibration generator unit, and thus itself for exertion of the force. Particularly, the drive unit can be switched off automatically as soon as a prescribed statistical minimum accuracy for the determination of position is reached. For example, it is also possible to fit a vibration generator unit on each of the members, in particular apart from the probe member, such that in the switched on state each of the members is moved and member setting of all these members is continuously varied.

Alternatively, the dynamization component can, however, also be designed as a handle arranged on one of the members such that the plurality of measurement settings can, for example, be generated by a manual movement by the user. For the purpose of simple fixing of the probe element in the measuring position, it is likewise possible in this case to arrange a handle on the probe member for a user to fix or maintain this position. In addition or as an alternative, a fixing component for clamping the probe member—in particular with the aid of a clamping mechanism—on an object positioned fixedly relative to the base can also be present for fixing the location of the probe member in space.

By way of example, optoelectronic goniometers and/or optoelectronic length gages can be used as the position measuring devices that are assigned to the respective connections, which can be pivoted, rotated or displaced, between the members.

By way of example, the coordinate measuring machine can be designed as an articulated arm and have at least three arm members as members that are interconnected partially via articulations enabling relative rotary movements and partially via suspensions enabling relative linear movements.

The invention further relates to a computer program product having a program code that is stored on a machine readable medium. In this case, the computer program product is suitable for carrying out the steps of:
  renewed acquisition of a set of measured variables for the different measurement settings in each case, and
  determination of the measuring position with the aid of a statistical evaluation of the recorded sets of measured variables
of the inventive measuring method, in particular when the program is executed in the evaluation unit of the coordinate measuring machine.

BRIEF DESCRIPTION OF THE DRAWINGS

The inventive method and the inventive device are described in more detail below, purely by way of example, with the aid of particular exemplary embodiments illustrated schematically in the drawings, further advantages of the invention also being explained. In detail:

FIG. 2 is a schematic of the inventive measuring method of the

DETAILED DESCRIPTION

In each case one tactile stylus such as, for example, a ruby ball is shown as probe element in the examples of the figures.

Here, the stylus is designed for making tactile contact with a measuring point of a measurement object surface. If the stylus is brought into contact with the measuring point to be measured, that is to say if the stylus is guided up to the measuring point such that it makes contact with said measuring point, the stylus assumes the measuring position or scanning position. Alternatively, however, it is also possible according to the invention to make use of further probe elements known from the prior art instead of the tactile stylus indicated throughout in the figures. Thus, by way of example it is possible for the probe element to be provided as optical sensors, in particular an optical distance gage for making optical contact with the measuring point to be measured on a measurement object surface, a laser scanner for scanning the measurement object surface, or a camera.

Figure 1:
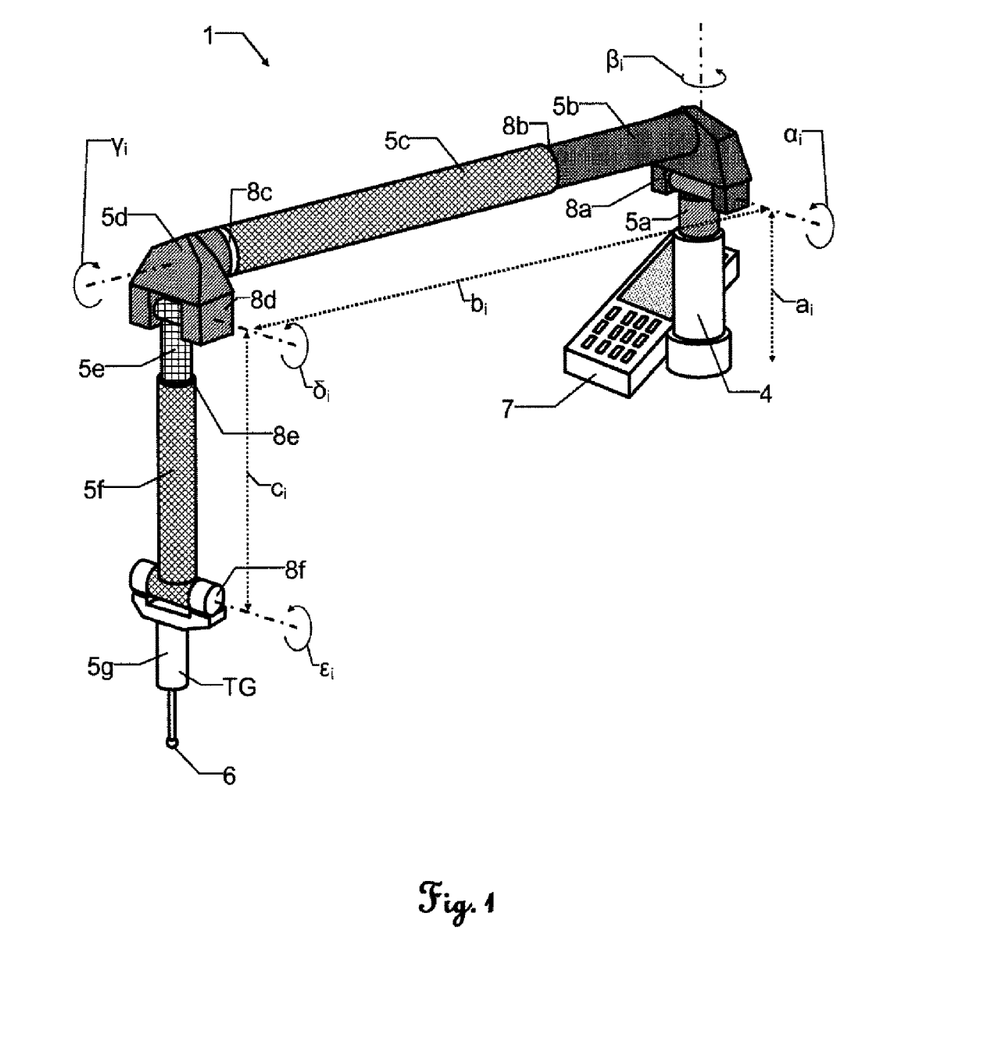
FIG. 1 shows an inventive coordinate measuring machine designed as an articulated arm.

FIG. 1 shows an inventive coordinate measuring machine 1 for a determination of the position of a measuring point. The coordinate measuring machine 1 is designed here as an articulated arm and has a base 4—fixed in a reference coordinate system and positioned in a known fashion. Shown by way of example successively starting from the base are seven arm members 5a-5g that are interconnected via articulations enabling relative rotary movements, and/or via suspensions enabling relative linear movements. For illustrative reasons, that is to say to illustrate for better understanding, these articulations and suspensions are not shown explicitly in visual form in FIG. 1, and in any case generic articulations and suspensions are sufficiently well known to the person skilled in the art.

A first one of the members 5a is fastened in this case to the base 4 such that it can move relative thereto, a second one of the members 5b is fastened on the first member 5a such that it can move relative thereto, etc. The seventh member 5g has a stylus 6 and forms the probe member TG. The stylus 6 can therefore move freely within a spatial section, and can be brought into contact with a point to be measured on an object surface. The stylus 6 is, for example, designed as a ruby ball, the stylus 6 being considered in general within the scope of the invention as that part of the probe member TG provided for making contact with the measuring point, and as punctiform. Once having made contact with the measuring point, the stylus 6 is located in the scanning position.

For the purpose of simpler distinction, the members 5a-5f are illustrated here in FIG. 1 with alternative differing hatchings in each case. The probe member TG is shown without hatching.

Respectively assigned to the articulations and suspensions are a plurality of position measuring devices 8a-8f for measuring settings of the members 5a-5f relative to one another in each case. For example, optoelectronic goniometers 8a, 8c, 8d and optoelectronic length gages 8b, 8e that are designed for measuring measured variables $\alpha_i$, $\beta_i$, $\gamma_i$, $\delta_i$, $\epsilon_i$, $a_i$, $b_i$, $c_i$ linked to the relative position of the members are provided as the position measuring devices 8a-8f. Thus, it is respectively angular deflections $\alpha_i$, $\beta_i$, $\gamma_i$, $\delta_i$, $\epsilon_i$ and length deflections $a_i$, $b_i$, $c_i$ between the members 5a-5f that are measured as measured variables $\alpha_i$, $\beta_i$, $\gamma_i$, $\delta_i$, $\epsilon_i$, $a_i$, $b_i$, $c_i$.

In accordance with the invention, the evaluation unit 7 is designed to acquire—in the course of a single measurement operation—a plurality of sets of measured variables for different measurement settings in a fixed scanning position of the stylus 6. In particular, the acquisition of sets of measured variables is performed in this case continuously over a certain measurement period at a specific acquisition rate that can, for example, be approximately ten hertz to approximately a few hundred kilohertz, while the measurement setting of the members 5a-5f are continuously changed during the same time in a fixed state of the stylus 6 in the scanning position. Alternatively, it is also possible to record sets of measured variables respectively at instants that follow one another rapidly but are randomly selected during a continuous changing of the measurement setting.

With the aid of a statistical evaluation of the recorded sets of measured variables, the evaluation unit calculates the position of the measuring point with which the stylus 6 makes contact from the plurality of the recorded sets of measured variables, doing so either following the acquisition of the sets of measured variables or already during such acquisition—and thus in a continuously updated fashion.

Figure 2:
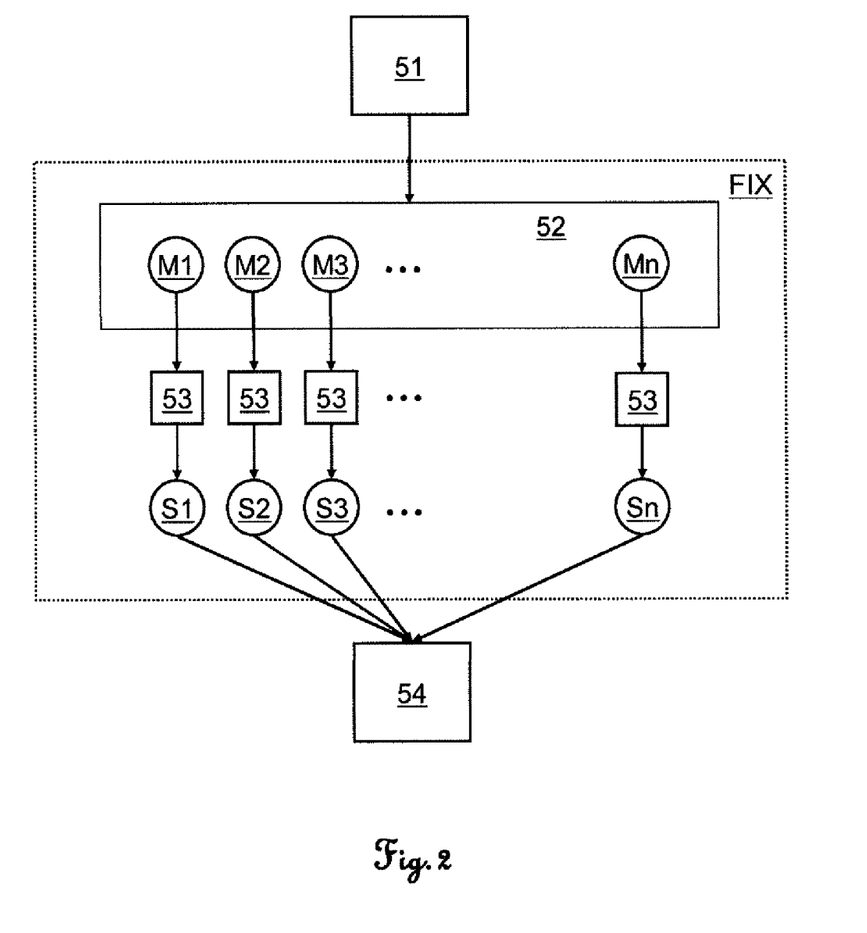

FIG. 2 is a schematic of the inventive method. As shown, in the course of the method the stylus makes contact 51 with the measuring point such that it assumes a scanning position.

This scanning position is maintained during the measurement, that is to say there is, as it were, a spatial fixing FIX of the stylus, it not being necessary to perform this as a separate step—there is, rather, the possibility of implicit performance by stopping the stylus in the scanning position. In this spatially fixed state FIX of the stylus in the scanning position, a plurality of different measurement settings M1, M2, M3, ..., Mi, ..., Mn are now generated 52 in accordance with the invention. In this process, a set S1, S2, S3, ..., Si, ..., Sn of measured variables are acquired 53 by measuring measured variables linked with the respective measurement setting M1, M2, M3, ..., Mi, ..., Mn of the members, which has been done respectively for the different measurement settings M1, M2, M3, ... Mi, ... Mn. Thus, at least one set S1, S2, S3, ..., Si, ..., Sn of measured variables is therefore recorded for each measurement setting M1, M2, M3, ..., Mi, ... Mn.

By way of example, a set $Si(\alpha_i, \beta_i, \gamma_i, \epsilon_i, a_i, b_i, c_i)$ of measured variables can in this case include in vector form all measured variables $\alpha_i$, $\beta_i$, $\gamma_i \delta_i$, $\epsilon_i$, $a_i$, $b_i$, $c_i$ measured for a measurement setting Mi of the members.

The determination 54 of the position of the measuring point relative to the base is then performed with the aid of a statistical evaluation of the recorded sets S1, S2, S3, ..., Si, ..., Sn of measured variables.

In a particular variant of the method, a statistical derivation of an accuracy value for the determination of the measuring point position can be performed—in addition to the determination of position. Corresponding statistical calculation methods that are suitable for estimating an accuracy for a position calculated from many individual measurements are known.

In a further particular design variant of the measuring method, a measurement period—during which the acquisition of sets S1, S2, S3, ..., Si, ..., Sn of measured variables is performed, in particular, continuously with a specific frequency and, for example the measurement setting M1, M2, M3, ... Mi, ... Mn is varied continuously by a slow, continuous movement of one of the members—can be selected such that a prescribed, statistically calculated minimum accuracy for the determination of the measuring point position is achieved. For example, a measurement stop signal can be indicated in an optical, acoustic and/or tactile fashion for this purpose after the minimum accuracy has been achieved.

Alternatively, the measurement period can also be selected in such a way that a predefined number, or a number dependent on a desired minimum accuracy, of different measurement settings M1, M2, M3, ..., Mi, ..., Mn is generated. A measurement stop signal can also be indicated in optical, acoustic and/or tactile fashion in this variant after a specific number has been achieved.

Figure 3:
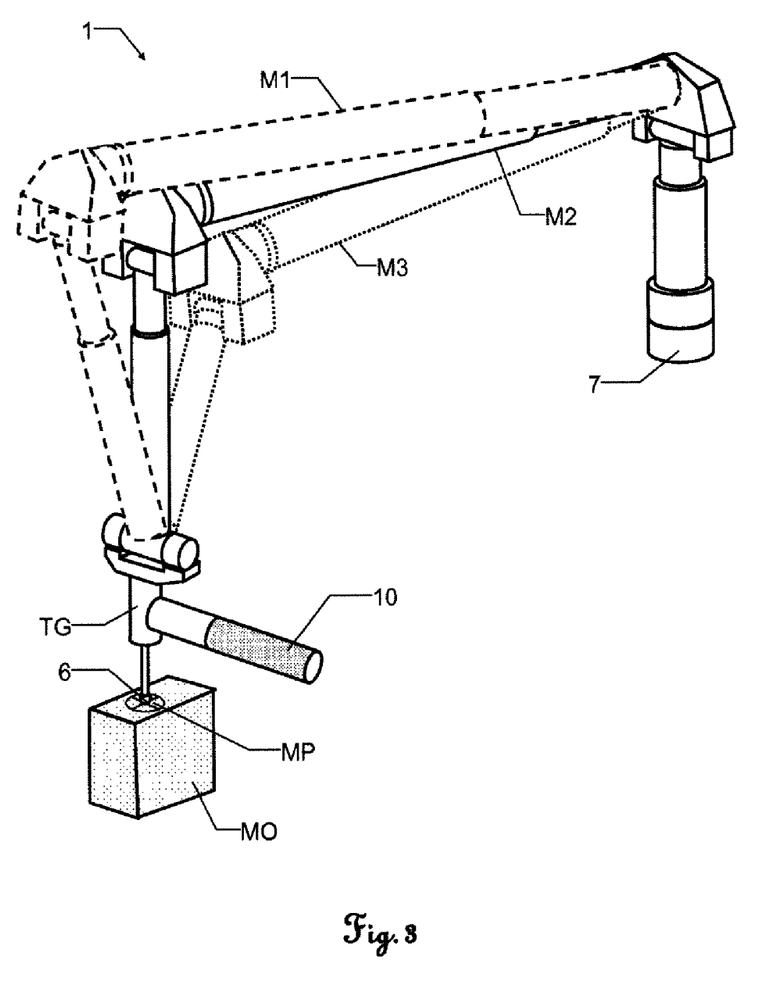
FIG. 3 shows an illustration of a plurality of measurement settings of the coordinate measuring machine with a spatially fixed stylus in the measuring or scanning position.

FIG. 3 shows the inventive coordinate measuring machine 1 having a stylus 6 that is located in the scanning position. This means that the stylus 6 makes mechanical tactile contact with the measuring point MP to be measured on the surface of the measurement object MO. In accordance with the invention, during the measurement operation the scanning position is maintained in order to determine the position of the one measuring point MP, and in the process the corresponding measured variables are recorded in a plurality of measurement settings M1, M2, M3—this being illustrated by respectively representing the arm members with unbroken, dashed and dotted lines. In order to determine the position, the measured variables acquired for the respective measurement settings M1, M2, M3 are statistically compensated by the evaluation unit 7, and the targeted measuring point position is calculated therefrom.

In a first design variant, the evaluation unit 7 can be designed in this case as a central evaluation unit. The position measuring devices assigned to the articulations, and the evaluation unit 7 can then be designed in such a way for bidirectional communication with one another via cable or without cable, in particular by radio or optically, in such a way that the measured variables respectively measured by the position measuring devices can be transmitted to the central evaluation unit, and that signals for synchronizing the recording of measured variables and processing measured variables can be transmitted to the respective position measuring devices via the central evaluation unit.

In a second design variant, the evaluation unit 7 respectively has decentral evaluation subunits that are assigned to the position measuring devices—and can, in particular, respectively be integrated in the position measuring devices—and a central evaluation component. In this arrangement, the respective evaluation subunits are designed for continuous and, in particular, automatic acquisition of a multiplicity of the respective measured variables for the different measurement settings, generated according to the invention, in the course of the determination of position, such that a statistical evaluation of the respective measured variables measured for the different measurement settings can be performed directly by the evaluation subunits.

The evaluations of the respective evaluation subunits already carried out are transmitted to the central evaluation component, which can derive the measuring position therefrom.

In order to fix the stylus 6 in the state making contact with the measuring point MP, a handle 10 is mounted on the last member having the stylus 6, specifically the probe member TG, so as to render it easier for a user to maintain the scanning position as required over the measurement period. In particular, it suffices in this case when the stylus 6 does not lose contact with the measuring point MP during the measurement. In this process, the probe member TG itself need not likewise be stationary in space. For example, it can even turn out to be advantageous when the setting of the probe member TG is also varied, for example by swiveling or rotating said probe member about the measuring point MP—while keeping in contact with the measuring point MP. However, it is also alternatively possible for the position of the probe member TG in space to be maintained such that a user can retain the scanning position easily and reliably.

Figure 4:
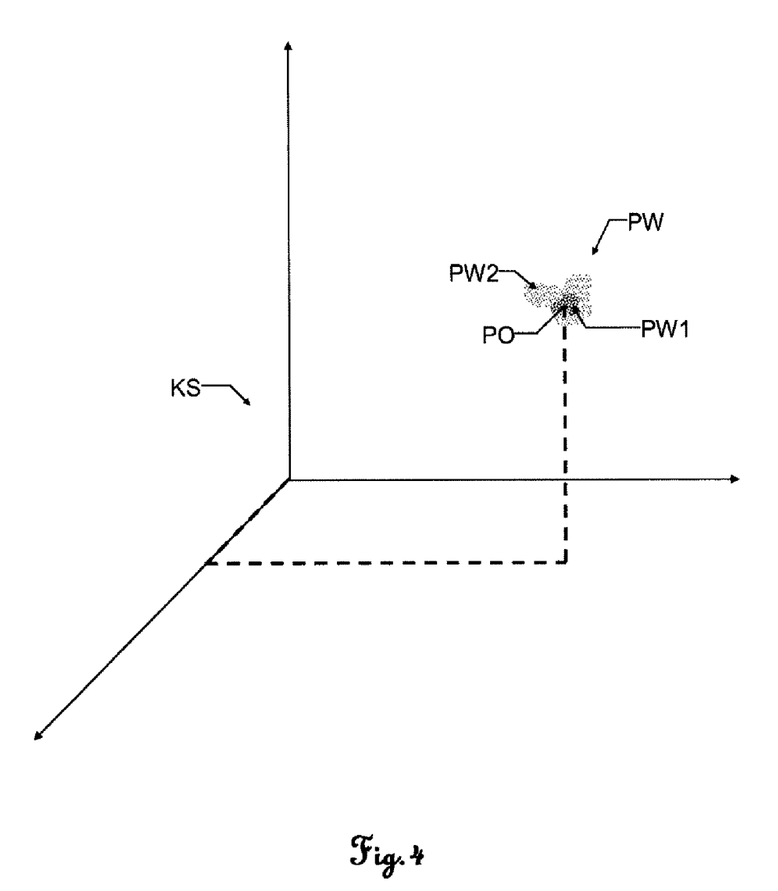
FIG. 4 shows a reference coordinate system in which positions calculated for the many measurement settings are plotted.

FIG. 4 shows a reference coordinate system KS in which positions respectively calculated separately are plotted for the many measurement settings.

Slight deviations between the measuring point positions calculated in a separate evaluation of the different sets of measured variables result from slight, device-related measurement inaccuracies of the position measuring devices as well as, if appropriate, from deformations of the member material not taken into account by the position measuring devices and which can respectively be expressed at various levels in different measurement settings. If the positions calculated for the different measurement settings, which all actually represent—with different deviations—the one position PO of the measuring point with which the stylus makes contact, are plotted in a reference coordinate system KS, the result is a point cloud PW about the actual, accurate position PO of the measuring point. Since the positions calculated for the different measurement settings have a statistical distribution in space that can be described, for example, by the Gaussian distribution, the point cloud PW in the close vicinity PW1 around the most probable actual measuring point position PO has a higher point density than at edge regions PW2 of the point cloud PW. By way of example, a geometric midpoint of the point cloud PW or, alternatively, a centroid of the point cloud PW can be calculated in order to determine an exact approximation for the actual measuring point position PO. In this case, it is fundamentally possible to apply all known statistical compensation methods. In particular, the individual measured variables, acquired in different measured settings, of the respective position measuring devices can also be averaged such that the measuring point position PO can be derived from these averaged relative positions of the individual members relative to one another.

Figure 5:
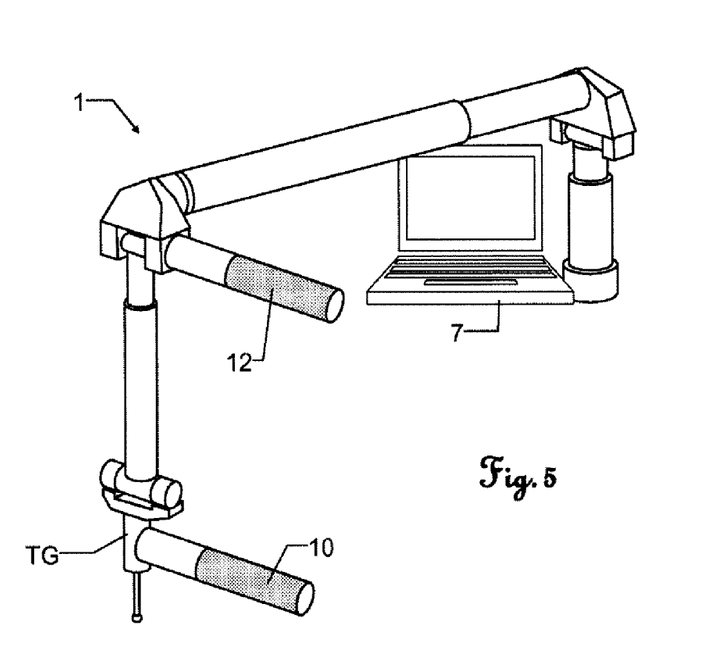
FIG. 5 shows the coordinate measuring machine with a fixing handle and a dynamization handle.

FIG. 5 shows a coordinate measuring machine 1 having a portable arithmetic logic unit, for example a laptop, as evaluation unit 7. A first handle 12 is arranged as dynamization component on one of the arm members of the measuring machine 1. In this case, the dynamization component can be used to exert—in a fashion simplified for a user—a force acting on this arm member, so that the dynamization component for the deflection of arm members from their original spatial position, and thus for the active generation of many different measurement settings is now formed.

As already shown in FIG. 3, the measuring machine 1 illustrated in FIG. 5 also has on the probe member TG a fixing handle 10 for maintaining a scanning position.

Figure 6:
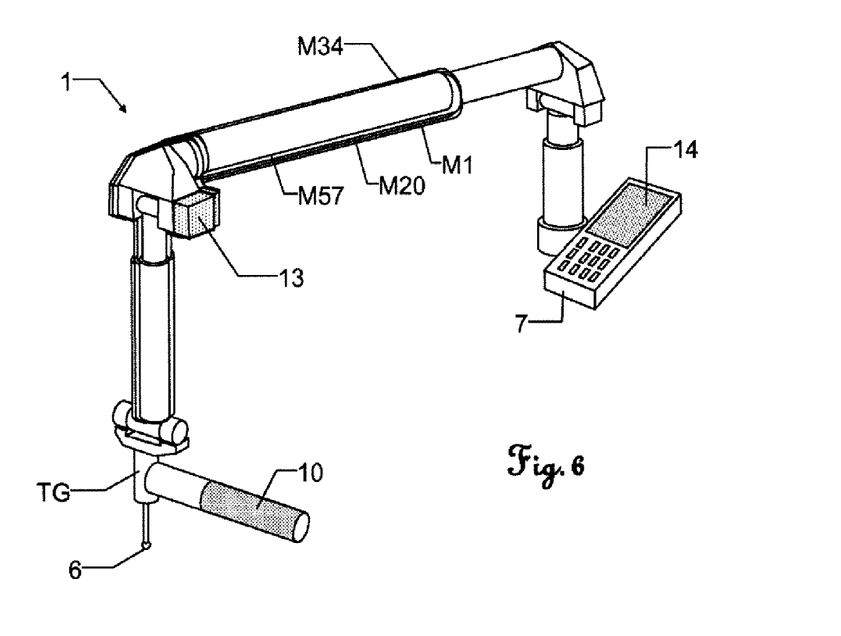
FIG. 6 shows the coordinate measuring machine with a fixing handle and an electric vibrator as dynamization component.

FIG. 6 shows a coordinate measuring machine having a dynamization component that is designed as a mechanical vibrator 13 and is, for example, fitted on one of the arm members. The, in particular, electrically operated vibrator 13, can preferably be controlled by the evaluation unit 7.

By way of example, the intensity of vibration of the vibrator 13 can be varied such that the members can be deflected both slightly, for example in the range below a ten-thousandth ohmmeter, and in a coarser range, for example in the millimeter or centimeter range, from their original position. It is thereby possible to generate a large bandwidth of different measurement settings (M1, . . . , M34, . . . , M20, . . . , M57, . . . , Mn). In particular, continuous jittering, jolting or vibrating movements can be pressed on the arm members by generic vibrators 13.

Particularly, by controlling the vibrator 13 the evaluation unit 7 can also switch off the vibrator 13 automatically, for example as soon as a prescribed measurement period ends, or as soon as a prescribed statistical minimum accuracy for the determination of position is achieved. Additionally or alternatively, it is also possible to indicate a measurement stop signal by the evaluation unit 7. In this case, the evaluation unit 7 can be implemented, for example, by a compact arithmetic logic unit with the possibility for user input, and a display 14—for example for the measurement stop signal, for the calculated measuring positions and, if appropriate, for estimated accuracy values of the measuring position data.

As already shown in FIGS. 3 and 5, the measuring machine illustrated in FIG. 6 also has on the probe member TG a fixing handle 10 for maintaining a scanning position.

As an alternative to the arrangement of the single vibrator 13, as illustrated in FIG. 6, it is also possible to arrange a plurality of vibrators—respectively one or more vibrators—particularly even on each arm member. It is likewise possible also to fit the vibrator 13 shown on another arm member—but advantageously not on the probe member TG. In order to deflect each individual arm member from its respective original spatial position for the purpose of the inventive generation of different measurement settings, however, it suffices in general to arrange a few vibrators for example respectively one vibrator on every third arm member.

Figure 7:
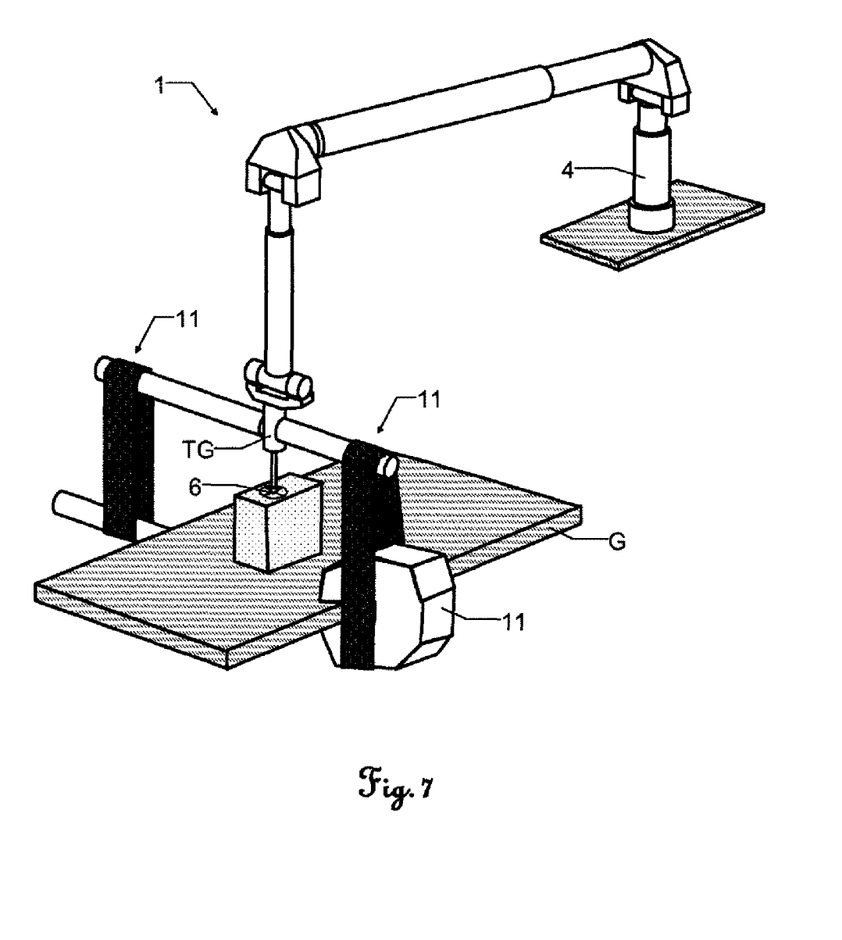
FIG. 7 shows the coordinate measuring machine with a fixing component.

FIG. 7 shows the coordinate measuring machine 1 having a fixing component 11, illustrated schematically, for clamping the probe member TG—in particular with the aid of a clamping mechanism—on an object G fixedly positioned relative to the base 4 such that the stylus 6 maintains the scanning position. The clamping mechanism illustrated in FIG. 7 is to be regarded purely by way of example, and so it is also possible here to apply any desired further known mechanisms and components in order to fix the probe member TG on a stationary object.

If an optical sensor, for example a line scanner or a camera, is used as probe element, all objects fixedly positioned in space can be used for the mechanical application of the probe element such that a measuring position of the probe element can be maintained during the inventive measurement. The optical sensor can in this case function in a fashion completely decoupled from the application object and, for example, scan a surface of a measurement object. In accordance with the invention, the position and alignment of the optical sensor itself can now be determined in space in an improved and highly precise fashion.

It goes without saying that these illustrated figures schematically represent only possible exemplary embodiments. According to the invention, the various approaches can be combined with one another and with methods and/or coordinate measuring machines of the prior art. For example, in the figures shown it is coordinate measuring machines designed as an articulated arm that are studied. However, it is similarly possible also to apply the inventive approaches in the case, for example, of coordinate measuring machines designed as portal measuring machines.

We claim:

1. A measuring method for determining a measuring position of a probe element with the aid of a coordinate measuring machine, the coordinate measuring machine having a base, and a plurality of members that can be moved relative to the base and relative to one another, one of the members having, as a probe member, the probe element, such that the probe element can be moved freely within a prescribed space volume, the method comprising:
    adopting the measuring position by the probe element;
    measuring by the coordinate measuring machine with the aid of position measuring device positions of the members relative to one another, as measurement variables linked to a measurement setting of the members, the measurement setting being determined by a relative position of the members to one another, and of at least one of the members relative to the base so as to acquire a set of measurement variables; and
    determining the measuring position relative to the base by the coordinate measuring machine, wherein:
        in a spatially fixed state of the probe element in the measuring position a plurality of different measurement settings are generated, the acquisition respectively being performed anew for these such that at least one set of measurement variables is recorded for each measurement setting; and
        the determination is performed with the aid of a statistical evaluation of the recorded sets of measured variables,
    wherein the different measurement settings are generated by a repeated changing of the relative position of at least two of the members relative to one another and/or of the relative position of at least two of the members relative to the base.

2. The measuring method as claimed in claim 1, wherein a compensation calculation is performed as statistical evaluation for the recorded sets of measurement variables.

3. The measuring method as claimed in claim 1, wherein a compensation calculation is performed as statistical evaluation for the recorded sets of measurement variables with the aid of the method of least squares, and/or an optimized statistical estimation method is applied for the statistical evaluation.

4. The measuring method as claimed in claim 1, wherein the different measurement settings are generated by a repeated changing of the relative position of at least two of the members relative to one another and/or of the relative position of at least two of the members relative to the base, the repeated changing being carried out by an exertion of a variant force on at least one point of action on one of the members manually via a user.

5. The measuring method as claimed in claim 1, wherein an angle and/or a distance of the members to/from one another, and of at least one of the members relative to the base are respectively measured as the measurement variables.

6. The measuring method as claimed in claim 1, wherein in order to fix the probe element spatially a relative position of the probe member in space is maintained during the measurement.

7. The measuring method as claimed in claim 1, wherein in order to fix the probe element spatially a relative position of the probe member in space is maintained during the measurement manually by a user.

8. The measuring method as claimed in claim 1, wherein an accuracy value for the determination of the measuring position is derived statistically.

9. The measuring method as claimed in claim 1, wherein a changing of the measurement settings and the acquisition of the sets of measurement variables are performed continuously within a measurement period.

10. The measuring method as claimed in claim 9, wherein the acquisition is performed with a specific frequency, the changing of the measurement settings being performed by producing continuous movements of a plurality of the members.

11. The measuring method as claimed in claim 10, wherein the changing of the measurement settings is performed by producing continuous movements of a plurality of the members with many movement reversals.

12. The measuring method as claimed in claim 9, wherein the measurement period is elected that a prescribed statistical minimum accuracy for the determination of the measuring position is achieved.

13. The measuring method as claimed in claim 9, wherein a measurement stop signal is indicated at the end of the measurement period in an optical, acoustic and/or tactile fashion.

14. The measuring method as claimed in claim 1, wherein a specific number of different measurement settings are generated, the number being selected such that a prescribed statistical minimum accuracy for the determination of the measuring position is achieved.

15. The measuring method as claimed in claim 1, wherein a specific number of different measurement settings are generated, the number being selected such that a prescribed statistical minimum accuracy for the determination of the measuring position is achieved, a measurement stop signal being indicated in an optical, acoustic and/or tactile fashion after achievement of the specific number of different measurement settings.

16. The measuring method as claimed in claim 1, wherein the probe element is designed for making tactile contact with a measuring point of a measurement object surface, as a result of which the measuring position is adopted.

17. The measuring method as claimed in claim 16, wherein the spatial fixing of the probe element is performed by maintaining a tactile contact between the probe element and the measuring point.

18. The measuring method as claimed in claim 1, wherein the probe element is designed for optically measuring a measuring point of a measurement object surface, or the probe element is designed for optically scanning or acquiring a measurement object surface.

19. A computer program product with program code, which is stored on a non-transitory machine readable medium, for carrying out the steps of:
  renewed acquisition of a set of measurement variables for the different measurement settings in each case; and
  determination of the measuring position of the probe element with the aid of a statistical evaluation of the recorded sets of measurement variables of the method as claimed in claim 1 when the program is executed in an evaluation unit.

20. A coordinate measuring machine for determining a measuring position of a probe element, comprising:
  a base;
  a plurality of members that can be moved relative to the base and relative to one another, one of the members having the probe element as probe member such that the probe element can be moved within a prescribed space volume;
  a plurality of position measuring devices for measuring measurement variables that depend on a measurement setting of the members, the measurement setting being given by a relative position of the members to one another, and at least one of the members being given relative to the base; and
  an evaluation unit for determining the measuring position, wherein the evaluation unit is designed for continuously acquiring, in the course of a determination of position, a plurality of sets of measurement variables for different measurement settings at a sole, fixed measuring position of the probe element, and the evaluation unit is also designed for deriving the measuring position of the measuring point with the aid of a statistical evaluation of the recorded sets of measured variables,
  wherein in a spatially fixed state of the probe element in the measuring position a plurality of different measurement settings are generated, the acquisition respectively being performed anew for these such that at least one set of measurement variables is recorded for each measurement setting; and
  the determination is performed with the aid of a statistical evaluation of the recorded sets of measured variables,
  wherein the different measurement settings are generated by a repeated changing of the relative position of at least two of the members relative to one another and/or of the relative position of at least two of the members relative to the base.

21. The coordinate measuring machine as claimed in claim 20, wherein the evaluation unit is designed for continuously and automatically acquiring the plurality of sets of measurement variables for different measurement settings at a sole, fixed measuring position of the probe element.

22. The coordinate measuring machine as claimed in claim 20, further comprising a handle or a vibration generator unit as dynamization component for actively generating the plurality of different measurement settings such that a force that acts on at least one of the members can be exerted by means of the dynamization component.

23. The coordinate measuring machine as claimed in claim 22, wherein the dynamization component is designed as an electrically operated drive unit and is switched off automatically as soon as a prescribed statistical minimum accuracy for the determination of position is achieved.

24. The measuring method as claimed in claim 22, wherein a varying force that acts on at least one of the members can be exerted by means of the dynamization component.

25. The coordinate measuring machine as claimed in 20, wherein goniometers and/or length gages are present as the position measuring devices.

26. The coordinate measuring machine as claimed in 20, wherein goniometers and/or length gages are present as the position measuring devices, the coordinate measuring machine being designed as an articulated arm with at least three arm members as members that are interconnected partially via articulations enabling relative rotary movements, and partially via suspensions enabling relative linear movements.

27. The coordinate measuring machine as claimed in claim 20, wherein the position measuring devices and the evaluation unit as central evaluation unit are designed for communication with one another via cable or without cable.

28. The coordinate measuring machine as claimed in claim 20, wherein the position measuring devices and the evaluation unit as central evaluation unit are designed communication with one another via cable or without cable by radio or optically, such that the measurement variables respectively measured by the position measuring devices are transmitted to the central evaluation unit, and signals for synchronizing the recording of measurement variables and the processing of measurement variables are transmitted to the respective position measuring devices by the central evaluation unit.

29. The coordinate measuring machine as claimed in claim 20, wherein the evaluation unit includes:
  decentral evaluation subunits that in each case are assigned to the position measuring devices and are designed for continuously, in the course of a determination of position, acquiring a multiplicity of the respective measurement variables for the different measurement settings, and for statistically evaluating the respective measured variables; and
  a central evaluation component for deriving the measuring position with the aid of the statistical evaluations of the respective evaluation subunits.

* * * * *